O. LUYTIES.
NUT LOCK.
APPLICATION FILED MAR. 12, 1912.

1,052,602.

Patented Feb. 11, 1913.
2 SHEETS—SHEET 1.

WITNESSES
Harry C. Helbig
John J. Ashley Jr.

INVENTOR
Otto Luyties
BY
Frank Gottschley
ATTORNEY

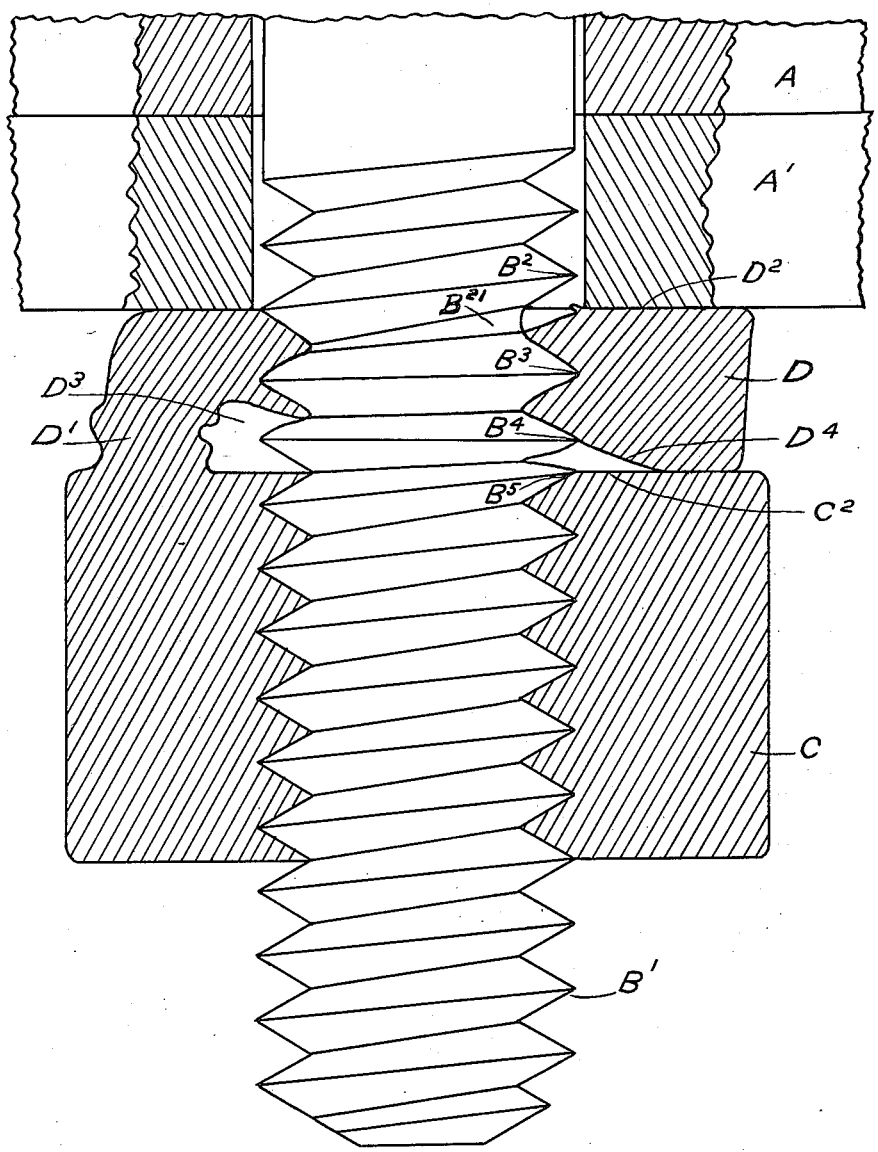

UNITED STATES PATENT OFFICE.

OTTO LUYTIES, OF NEW YORK, N. Y.

NUT-LOCK.

1,052,602.   Specification of Letters Patent.   Patented Feb. 11, 1913.

Application filed March 12, 1912. Serial No. 683,264.

*To all whom it may concern:*

Be it known that I, OTTO LUYTIES, a citizen of the United States, and a resident of New York city, in the county of New York and State of New York, have invented certain new and useful Improvements in Nut-Locks, of which the following is a specification.

My invention relates to lock nuts and the object of my invention is to provide a nut lock formed in a single piece with the nut.

A further object is to provide a lock nut which locks automatically by abutment under pressure against an abutting surface.

A further object is to provide a lock nut which will present when locked a bridge between the nut and nut locking portion.

A further object is to provide a lock nut that can be used as an ordinary nut, by breaking the locking portion from the main body portion of the nut.

A further object is to provide a lock nut which locks to the bolt by distorting the thread or changing the pitch of the thread in the lock portion relative to the pitch in the main body portion of the nut.

With this and other objects in view hereinafter set forth, I refer to the drawings forming a part of this specification, in which—

Figure 1:
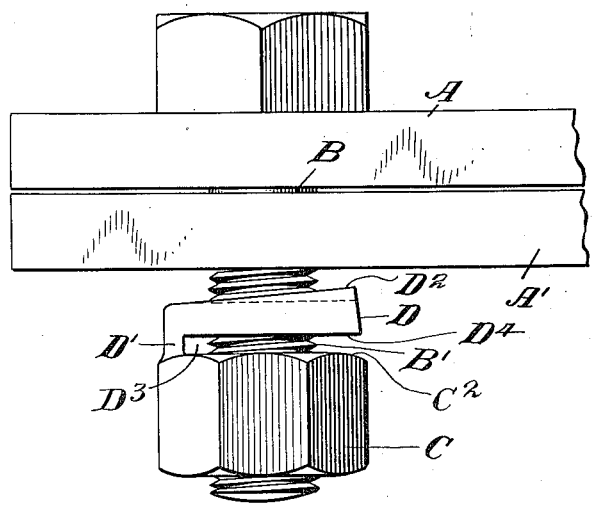
Figure 2:
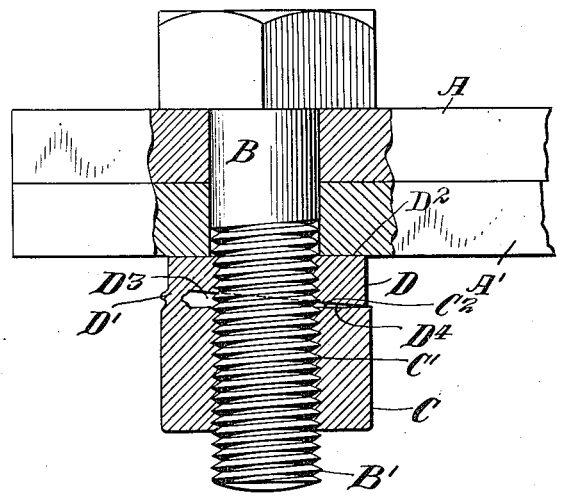

Figure 1 is a general exterior view of a lock nut mounted on a bolt and shown in unlocked relation thereto. Fig. 2 is a vertical sectional view of the lock nut as it appears when in locked engagement with a bolt. Fig. 3 is a detail view on an enlarged scale, illustrating the distortion of the threads produced when the nut is locked in place.

A and A' indicate two sheets of metal and B a bolt to hold them together, which is provided with a threaded shank portion B'. C, indicates the main body portion of a nut of usual construction, provided with a thread C' to fit the thread on the bolt B, and D, indicates the locking member which is connected integrally at D', thus forming a slot D³ which extends across the bolt to the portion D'. The latter is a short substantially non-resilient connection which is adapted to receive a permanent set when bent. The lock portion D is threaded with a plurality of threads in direct pitch and continuation of the thread C' and the outer face D² of the lock portion is preferably arranged at a slight angle to that of the face C² of the main body portion as shown.

To lock the nut, a wrench is placed on the hexagon portion of the nut C, and the face D² forced against the face of the plate A' with sufficient force to distort the thread in the lock portion D and to disturb the continuity thereof with respect to the thread in the main body portion C. When the outermost end of the face D² touches the abutment, it causes the comparatively weak connection D' to yield and the locking portion D swings substantially longitudinally of the bolt until the free end D⁴ of this portion touches face C² of the body of the nut, resulting in a bridging effect for sustaining the locking portion at its two ends. Further movement of the body portion C will result in a substantially bodily movement of the locking portion D toward body portion C. Thus the nut is locked in place by a permanent distortion thereof, which distortion remains even when the nut is backed off from the abutment.

Referring to the enlarged detail view shown in Fig. 3 it will be noted that the threads B² and B³ of the bolt, engaging the locking portion D, are distorted with reference to the threads B⁴ and B⁵ on either side thereof. Threads B² and B³ have been shifted bodily downward and swung to the right as indicated by the space B²¹ between threads B² and B³ and also by the crowding together of threads B⁴ and B⁵. Of course, the threads in the locking portion D are similarly distorted. It will be seen, therefore, that in the above construction, the nut screws on easy and locks automatically by jamming against the abutment, without the aid of any special device outside the nut itself. Moreover, when once locked it offers a permanent resistance toward being unscrewed, which resistance continues even after the nut is backed off from the abutment.

Having thus described my invention, I claim as new:—

1. A lock nut comprising a body portion and a lock portion connected thereto at one side thereof by a narrow strip of metal which holds the adjacent faces of the body portion and lock portion apart a predetermined distance from each other, said lock portion having its outer face normally inclined at an angle to that of the median line across the body portion, said body portion and lock portion having a thread of uniform and continuing pitch relative to each other.

2. A lock nut comprising a body portion and a lock portion connected thereto at one side thereof by a narrow strip of metal which holds the adjacent faces of the body portion and lock portion apart a predetermined distance from each other, said lock portion having its outer face normally inclined at an angle to that of the median line across the body portion, and the inner adjacent plane surfaces being formed parallel with each other, said body portion and lock portion having a thread of uniform and continuing pitch relative to each other.

3. A lock nut comprising a body portion and a lock portion connected thereto at one side thereof by a narrow strip of metal and formed integral which holds the adjacent faces of the body portion and lock portion apart a predetermined distance from each other, said lock portion having its outer face normally inclined at an angle to that of the median line across the body portion, said body portion and lock portion having a thread of uniform and continuing pitch relative to each other.

4. A lock nut comprising a body portion and a locking portion, a short substantially non-resilient connection between the body portion and locking portion, said connection being yieldable substantially longitudinally of the geometrical axis of the nut, said portions having normally a continuous thread adapted to easily screw on a bolt.

5. A lock nut comprising a body portion and a locking portion, a short substantially non-resilient connection for said portions located at one side thereof, said connection being yieldable substantially longitudinally of the axis of the bolt, said portions having normally a continuous thread adapted to easily screw on a bolt.

6. A lock nut comprising a body portion and a locking portion, a yielding substantially non-resilient non-threaded connection between the body portion and locking portion, said portions having normally a continuous thread adapted to easily screw on a bolt, said locking portion having fewer threads than said body portion and adapted to be distorted by the comparatively larger force which is transmitted by said body portion.

Signed at New York city, in the county of New York and State of New York, this 6th day of March, A. D. 1912.

OTTO LUYTIES.

Witnesses:
FRANK M. ASHLEY,
MANUAL M. VOIT.